(12) United States Patent
Yoo (10) Patent No.: US 11,889,376 B2
(45) Date of Patent: Jan. 30, 2024

(54) METHOD AND APPARATUS FOR DETERMINING LOCATION OF DEVICE USING MULTIPLE ANTENNA SWITCHING

(71) Applicant: LG INNOTEK CO., LTD., Seoul (KR)

(72) Inventor: Chang Hoon Yoo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 350 days.

(21) Appl. No.: 17/284,090

(22) PCT Filed: Apr. 1, 2019

(86) PCT No.: PCT/KR2019/003771
§ 371 (c)(1),
(2) Date: Apr. 9, 2021

(87) PCT Pub. No.: WO2020/075931
PCT Pub. Date: Apr. 16, 2020

(65) Prior Publication Data
US 2021/0377692 A1  Dec. 2, 2021

(30) Foreign Application Priority Data
Oct. 11, 2018 (KR) .................. 10-2018-0120967

(51) Int. Cl.
*H04W 4/021* (2018.01)
*H04B 17/318* (2015.01)

(52) U.S. Cl.
CPC .......... *H04W 4/021* (2013.01); *H04B 17/318* (2015.01)

(58) Field of Classification Search
CPC ....... H04W 4/021; H04W 4/025; H04W 4/80; H04W 88/02; H04B 17/318;
(Continued)

(56) References Cited

U.S. PATENT DOCUMENTS

2017/0151928 A1  6/2017 Kang et al.
2017/0156027 A1  6/2017 Peng
(Continued)

FOREIGN PATENT DOCUMENTS

CN   101042779 A   9/2007
CN   108353361 A   7/2018
(Continued)

*Primary Examiner* — Huy C Ho
(74) *Attorney, Agent, or Firm* — Birch, Stewart, Kolasch & Birch, LLP (57) ABSTRACT

The present invention relates to a method and an apparatus for determining a location of a device using multiple antenna switching. A method for determining a location of a device using multiple antenna switching according to one embodiment of the present invention may comprise: a first determination step of determining whether a device enters a target proximity zone or a target zone on the basis of a received signal strength indicator (RSSI) value received through a second antenna having a first coverage; a step of connecting a third antenna through antenna switching if it is determined that the device has entered the target proximity zone or the target zone in the first determining step; a second determination step of determining whether the device enters the target zone on the basis of a RSSI value received through the third antenna having a second coverage; and a step of confirming that the device has entered the target zone if it is determined that the device has entered the target zone in the second determination step.

20 Claims, 6 Drawing Sheets

(58) Field of Classification Search
CPC ............ B60R 2325/101; B60R 25/245; B60R 2325/205; B60R 25/01; B60R 25/10; H01Q 1/325
USPC ...................................................... 455/456.1
See application file for complete search history.

(56) References Cited

U.S. PATENT DOCUMENTS

| | | |
|---|---|---|
| 2017/0243422 A1 | 8/2017 | Menard et al. |
| 2017/0249791 A1* | 8/2017 | Woo .......................... B60R 25/24 |
| 2018/0029560 A1 | 2/2018 | Mohaupt et al. |
| 2018/0213355 A1 | 7/2018 | Smith et al. |

FOREIGN PATENT DOCUMENTS

| | | |
|---|---|---|
| JP | 2010-59784 A | 3/2010 |
| JP | 2011-208464 A | 10/2011 |
| JP | 2015-137493 A | 7/2015 |
| JP | 2016-17367 A | 2/2016 |
| JP | 2016-56667 A | 4/2016 |
| JP | 2017-92533 A | 5/2017 |
| JP | 2018-43714 A | 3/2018 |
| KR | 10-2009-0114900 A | 11/2009 |
| KR | 10-2014-0094247 A | 7/2014 |
| KR | 10-1509596 B1 | 4/2015 |
| KR | 10-1604807 B1 | 3/2016 |
| KR | 10-2016-0044119 A | 4/2016 |
| KR | 10-1682306 B1 | 12/2016 |
| KR | 10-2017-0063389 A | 6/2017 |
| KR | 10-2017-0101556 A | 9/2017 |
| KR | 10-2018-0059094 A | 6/2018 |

* cited by examiner

METHOD AND APPARATUS FOR DETERMINING LOCATION OF DEVICE USING MULTIPLE ANTENNA SWITCHING

CROSS REFERENCE TO RELATED APPLICATIONS

This application is the National Phase of PCT International Application No. PCT/KR2019/003771, filed on Apr. 1, 2019, which claims priority under 35 U.S.C. 119(a) to Patent Application No. 10-2018-0120967, filed in the Republic of Korea on Oct. 11, 2018, all of which are hereby expressly incorporated by reference into the present application.

TECHNICAL FIELD

Embodiments relate to a location determination method, and more particularly to a method and apparatus for determining the location of a device by switching between multiple antennas for more accurately determining the location of a device close to a vehicle by actively performing multiple antenna switching based on received signal strength indicator (RSSI) data in a vehicle smart key fob system including multiple antennas having different coverage zones.

BACKGROUND ART

Recently, with the rapid development of information and communication technology, a society based on ubiquitous information and communication technology has been formed.

In order to connect information and communication apparatuses anywhere and anytime, sensors each having a computer chip having a communication function need to be installed in all social facilities.

In particular, recently, various location determination technologies have been introduced, and various location-based services have been provided.

One of the core technologies for implementing 'invisible technology', which is the characteristic of a ubiquitous society, is a location estimation technology. The location estimation technology not only enables an automatic computing environment based on active detection rather than a passive computing environment based on a user's request, but also enables a computing environment that is capable of providing information or controlling other devices smoothly even in a situation in which the user is not aware thereof. Accordingly, recently, research has been conducted into location estimation technology using various communication methods. In particular, location-based service (LBS) using an automatic navigation device and a global positioning system (GPS) and location-based service based on a mobile communication network have already been implemented in various fields and have become indispensable technology in the modern society.

In recent years, location estimation technology has also been introduced for vehicle control.

The most fundamental factor in a vehicle location estimation system is to measure the distance between a vehicle and a target device. A simple and inexpensive method for measuring the distance therebetween is a method of measuring a received signal strength value of a wireless signal, that is, a received signal strength indication (RSSI) value, and converting the same into a distance. However, such a scheme is capable of being simply implemented and used in many applications, but in the case of a complex indoor environment with many obstacles, the distance measurement may contain a large error.

An RSSI value measured in an outdoor environment in which a line of sight (LoS) is ensured does not have a large difference from an ideal RSSI value, but there is a problem in that it is difficult to accurately measure an RSSI value due to various causes of errors, for example, obstacles, walls, pillars, movement of people, and other radio signals in an indoor environment such as the inside of a building or an underground parking lot.

When the reliability of the measured RSSI value is degraded and the location of a device in a vehicle is incorrectly determined, the vehicle may malfunction.

For example, when a driver who carries a device does not actually get into a vehicle, the vehicle may erroneously receive an RSSI value from the device and may be controlled to be started.

Accordingly, there is a need for a device location determination method for more accurately determining the location of a target device despite various causes of errors.

DISCLOSURE

Technical Problem

Embodiments provide a method and apparatus for determining the location of a device by switching between multiple antennas.

Embodiments provide a method and apparatus for determining the location of a device by switching between multiple antennas for more accurately determining the location of a device close to a vehicle by actively performing multiple antenna switching based on received signal strength indicator (RSSI) data in a vehicle smart key fob system including multiple antennas having different coverage zones.

The technical problems solved by the embodiments are not limited to the above technical problems and other technical problems which are not described herein will become apparent to those skilled in the art from the following description.

Technical Solution

Embodiments provide a method and apparatus for determining the location of a device by switching between multiple antennas.

A method of determining the location of a device by switching between multiple antennas according to an embodiment includes a first determination operation of determining whether the device enters a target proximity zone or a target zone based on a received signal strength indicator (RSSI) received through a second antenna having a first coverage zone, when determining that the device enters the target proximity zone or the target zone in the first determination operation, connecting a third antenna through an antenna switching, a second determination operation of determining whether the device enters the target zone based on the RSSI value received through a third antenna having a second coverage zone, and when determining that the device enters the target zone in the second determination operation, finally determining whether the device enters the target zone.

The first coverage zone may be larger than the second coverage zone.

The RSSI value may be received through Bluetooth Low Energy (BLE) communication.

The first determination operation may include comparing the received RSSI data with a first reference value, and when the received RSSI value is greater than the first reference value, the device may be determined to enter the target proximity zone or the target zone.

The second determination operation may include comparing the received RSSI data with a second reference value, and when the received RSSI value is greater than the second reference value, the device may be finally determined to enter the target zone.

The first reference value and the second reference value may be different from each other.

The method may further include, prior to the first determination operation, when a corresponding vehicle enters a security mode, connecting the second antenna and transmitting an advertising signal, and, when detecting the device, establishing connection through communication and requesting the device to transmit RSSI data.

When the vehicle is turned off and a door lock is set, the vehicle may enter the security mode.

The method may further include, when finally determining that the device enters the target zone, performing a vehicle control operation based on RSSI data received through the third antenna.

The vehicle control operation may include at least one of a welcome operation, a door-unlocking operation, or a start control operation.

A vehicle smart key fob device according to another embodiment includes a second antenna and a third antenna, a nearfield communication unit configured to transmit and receive a signal through the second antenna or the third antenna, an antenna switch configured to connect any one of the second antenna and the third antenna to the nearfield communication unit, and a controller configured to perform a first determination procedure of determining whether a device enters a target proximity zone or a target zone based on a received signal strength indicator (RSSI) value received through the second antenna, having a first coverage zone, to control the antenna switch to connect the third antenna upon determining that the device enters the target proximity zone or the target zone through the first determination procedure, to perform a second determination procedure of determining whether the device enters the target zone based on an RSSI value received through the third antenna, having a second coverage zone, and to finally determine that the device enters the target zone upon determining that the device enters the target zone through the second determination procedure.

The first coverage zone may be larger than the second coverage zone.

The nearfield communication unit may perform Bluetooth Low Energy (BLE) communication and the RSSI value may be received through the BLE communication.

When the received RSSI value is greater than a first reference in the first determination procedure, the controller may determine that the device enters the target proximity zone or the target zone.

When the received RSSI value is greater than a second reference value in the second determination procedure, the controller may finally determine that the device enters the target zone.

The first reference value and the second reference value may be different from each other.

Prior to the first determination procedure, when a corresponding vehicle enters a security mode, the controller may control the antenna switch to transmit an advertising signal through the second antenna, and upon detecting the device, the controller may establish a connection through communication and may request the device to transmit RSSI data.

When the vehicle is turned off and a door lock is set, the vehicle may enter the security mode.

Upon finally determining that the device enters the target zone, the controller may perform a vehicle control operation based on RSSI data received through the third antenna.

The vehicle control operation may include at least one of a welcome operation, a door-unlocking operation, or a start control operation.

According to another embodiment, a computer-readable recording medium has recorded thereon a program for executing any one of the aforementioned methods of determining the location of the device by switching between multiple antennas.

The aspects of the embodiments are only a portion of the exemplary embodiments, and various embodiments based on technical features of the embodiments may be devised and understood by one of ordinary skill in the art based on the detailed description of the disclosure.

Advantageous Effects

A method, an apparatus, and a system according to an embodiment may have the following effects.

Embodiments provide a method and apparatus for determining the location of a device by switching between multiple antennas.

Embodiments provide a method and apparatus for determining the location of a device by switching between multiple antennas for more accurately determining the location of a device close to a vehicle by actively performing multiple antenna switching based on received signal strength indicator (RSSI) data in a vehicle smart key fob system including multiple antennas having different coverage zones.

It will be appreciated by persons skilled in the art that that the effects that could be achieved with the present disclosure are not limited to what has been particularly described hereinabove and other advantages of the present disclosure will be more clearly understood from the detailed description.

BEST MODE

A method of determining the location of a device by switching between multiple antennas according to an embodiment may include a first determination operation of determining whether the device enters a target proximity zone or a target zone based on a received signal strength indicator (RSSI) received through a second antenna having a first coverage zone, connecting a third antenna through an antenna switching upon determining that the device enters the target proximity zone or the target zone in the first determination operation, a second determination operation of determining whether the device enters the target zone based on the RSSI value received through a third antenna having a second coverage zone, and, upon determining that the device enters the target zone in the second determination operation, finally determining whether the device enters the target zone.

MODE FOR INVENTION

Reference will now be made in detail to embodiments of the disclosure, examples of which are illustrated in the accompanying drawings. The suffixes "module" and "unit" used to describe elements herein are used for convenience of description and thus may be used interchangeably, and do not have any distinguishable meanings or functions.

In the description of exemplary embodiments, it will be understood that, when an element is referred to as being "on" or "under" another element, the element can be directly on another element or intervening elements may be present. In addition, when an element is referred to as being "on" or "under" another element, this may include the meaning of an upward direction or a downward direction based on one component.

Figure 1:
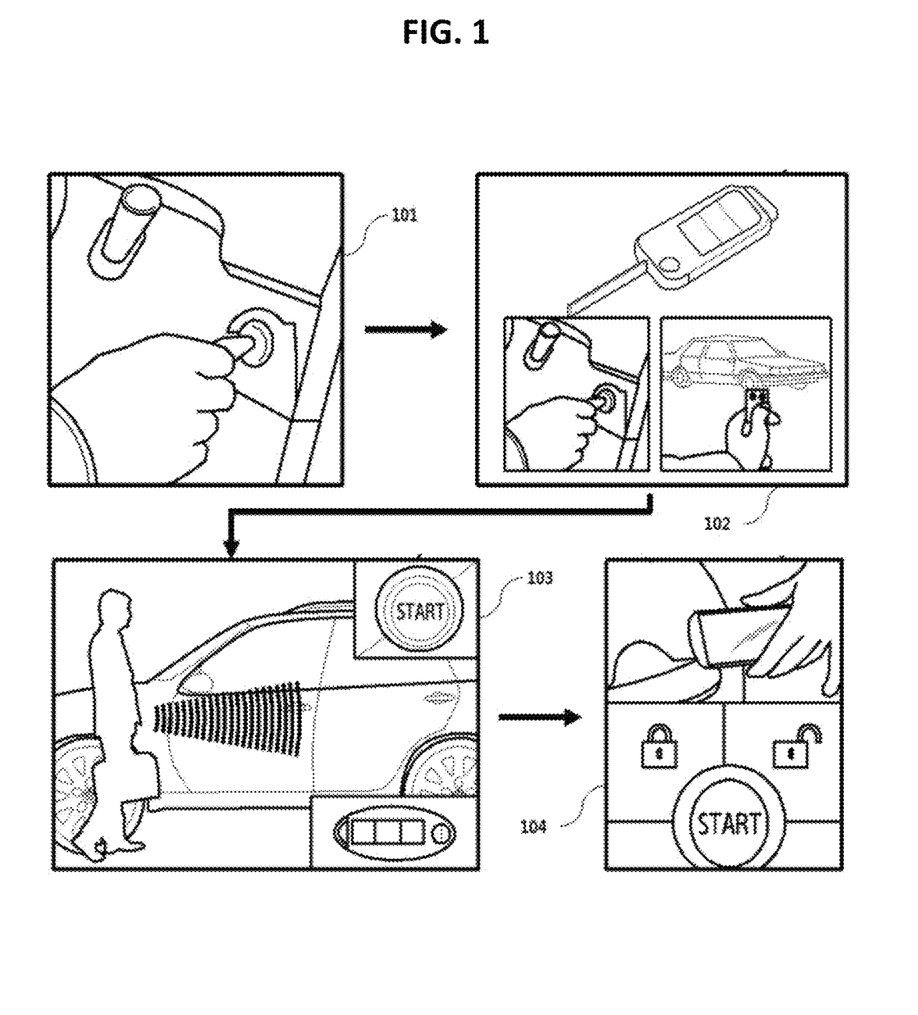
FIG. 1 is a diagram for explaining various conventional methods of entry into a vehicle and control of vehicle start.

FIG. 1 is a diagram for explaining various conventional methods of entry into a vehicle and control of vehicle start.

Referring to reference numeral 101 of FIG. 1, in the most traditional methods of entry into a vehicle and control of vehicle start, a driver may open and close a vehicle door and a vehicle trunk and may start vehicle using a vehicle key for the corresponding vehicle.

Referring to reference numeral 102 of FIG. 1, the driver may remotely control a function of opening or closing the door or the trunk, a function of blinking a warning light, and a function of turning on/off an engine using a remote controller for the corresponding vehicle.

Referring to reference numeral 103 of FIG. 1, most vehicles that are currently released have a remote keyless entry system that is controlled to identify the location of a smart key by authenticating the smart key through wireless communication with the smart key by a smart key module installed in a vehicle, to automatically control a welcome lighting operation based on the identified location and/or a side mirror opening and closing operation based on side mirror settings, and to open a door for a driver based on the authentication result of the smart key, without separate manipulation of smart key buttons and keys. In the case of the remote keyless entry system, the driver may start the vehicle using a start button included in the vehicle.

Referring to reference numeral 104 of FIG. 1, recently, research has been actively conducted into a function that allows a smart vehicle terminal mounted on a vehicle to open and close a door using nearfield communication with a smartphone as well as to control engine start through the smartphone without a separate smart key.

Figure 2:
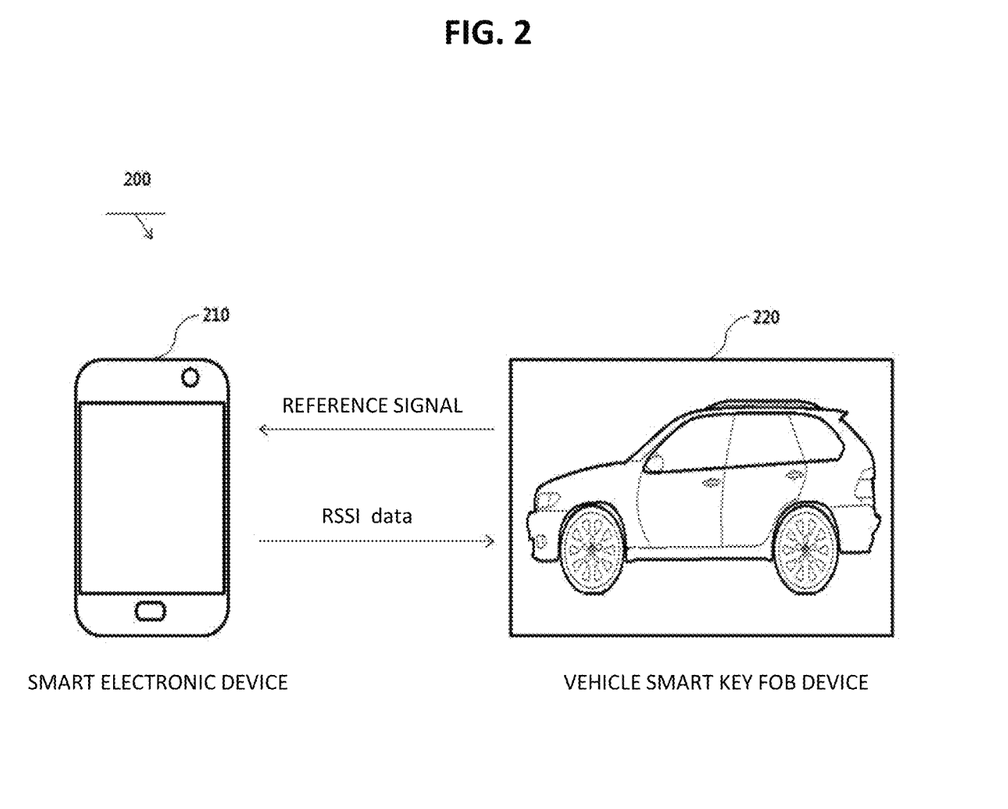
FIG. 2 is a diagram for explaining a basic operation of a smart key fob system according to an embodiment.

FIG. 2 is a diagram for explaining a basic operation of a smart key fob system 200 according to an embodiment.

The smart key fob system 200 may broadly include a smart electronic device 210 and a vehicle smart key fob device 220.

For example, the smart electronic device 210 may include, but is not limited to, an electronic device such as a smartphone or a wearable device.

When detecting the smart electronic device 210, the vehicle smart key fob device 220 may authenticate the corresponding smart electronic device 210 and may set a communication channel.

For example, the communication channel may be a Bluetooth Low Energy (BLE) communication channel.

For example, the vehicle smart key fob device 220 may periodically (or continuously) transmit a predetermined reference signal through the set communication channel.

In another example, the vehicle smart key fob device 220 may also transmit a beacon signal having a predetermined intensity as the reference signal.

The smart electronic device 210 may transmit received signal strength indicator (RSSI) data measured based on the reference signal to the vehicle smart key fob device 220 through the communication channel.

The vehicle smart key fob device 220 may identify the location of the smart electronic device 210 based on the received RSSI data and may perform a predefined vehicle control operation based on the identified location.

Here, the vehicle control operation may include, but is not limited to, an automatic door locking/unlocking operation, a remote start control operation, or a welcome lighting/side mirror control operation.

When determining that the smart electronic device 210 approaches within a first distance, the vehicle smart key fob device 220 according to an embodiment may perform control to perform a welcome operation.

When determining that the smart electronic device 210 approaches within a second distance, the vehicle smart key fob device 220 may automatically release door lock settings. Here, the second distance may be shorter than the first distance.

When determining that the smart electronic device 210 approaches within a third distance, the vehicle smart key fob device 220 may perform control to enable vehicle start. Here, the third distance may be shorter than the second distance.

In general, BLE communication is sensitive to surrounding environments and ambient noise. Accordingly, the RSSI value measured by the smart electronic device 210 with respect to a BLE communication signal may have a very large variance. There is a problem in that an RSSI value having a large variance in a short time is difficult to rely on.

In particular, when an RSSI value having a large variance is used unchanged in order to determine the location of the smart electronic device 210, the probability that the vehicle smart key fob device 220 fails to calculate a correct location may increase, which is problematic in that the probability of malfunction increases when the vehicle smart key fob device 220 controls the vehicle.

Hereinafter, a vehicle smart key fob device for rapidly and accurately determining the location of a corresponding device with respect to an RSSI having a large variance due to the surrounding environment will be described with reference to an embodiment.

Figure 3:
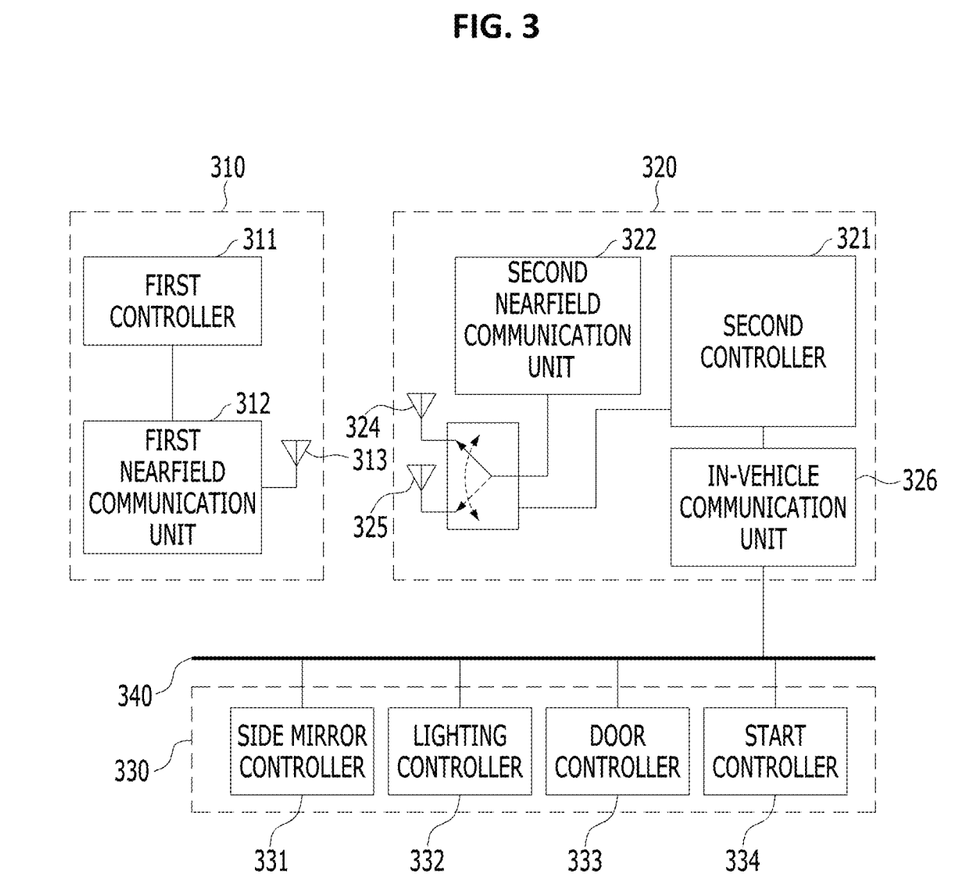
FIG. 3 is a diagram for explaining detailed components of a smart key fob system according to an embodiment.

FIG. 3 is a diagram for explaining detailed components of a smart key fob system according to an embodiment.

Hereinafter, a device-location-determining procedure in a smart key fob system will be described below in detail with reference to FIG. 3 above and FIG. 4 to be described later.

Referring to FIG. 3, a smart key fob system 300 may broadly include a smart electronic device 310, a vehicle smart key fob device 320, and a vehicle electronic control device 330.

The smart electronic device 310 and the vehicle smart key fob device 320 may perform nearfield communication. For example, the nearfield communication may be BLE communication.

The vehicle smart key fob device 320 and the vehicle electronic control device 330 may be connected through an in-vehicle communication network. For example, the in-vehicle communication network may include a controller area network (CAN) communication network or a vehicle Ethernet communication network.

The smart electronic device 310 may include a first controller 311, a first nearfield communication unit 312, and a first antenna 313.

The vehicle smart key fob device 320 may include a second controller 321, a second nearfield communication unit 322, an antenna switch 323, a second antenna 324, a third antenna 325, and an in-vehicle communication unit 326.

The first nearfield communication unit 312 may decode a signal received through the first antenna 313, and may transfer the decoded signal to the first controller 311.

For example, upon receiving an advertising signal through a first nearfield communication modem 312, the first controller 311 may control the first nearfield communication modem 312 to transmit a connection indication signal and to connect the vehicle smart key fob device 320 through nearfield communication.

In another example, when receiving an received signal strength indicator (RSSI) transmission request signal from the vehicle smart key fob device 320, the first controller 311 may perform control to measure a received signal strength indicator (RSSI) of a predetermined reference signal, e.g., a beacon signal, received from the vehicle smart key fob device 320 and to transmit the measurement result to the vehicle smart key fob device 320. For example, the first nearfield communication modem 312 may measure the RSSI according to a predetermined control signal of the first controller 311.

When the vehicle is turned off and then vehicle door lock is set, the second controller 321 of the vehicle smart key fob device 320 may control the antenna switch 323 to connect the second nearfield communication unit 322 and the second antenna 324 to each other.

Figure 4:
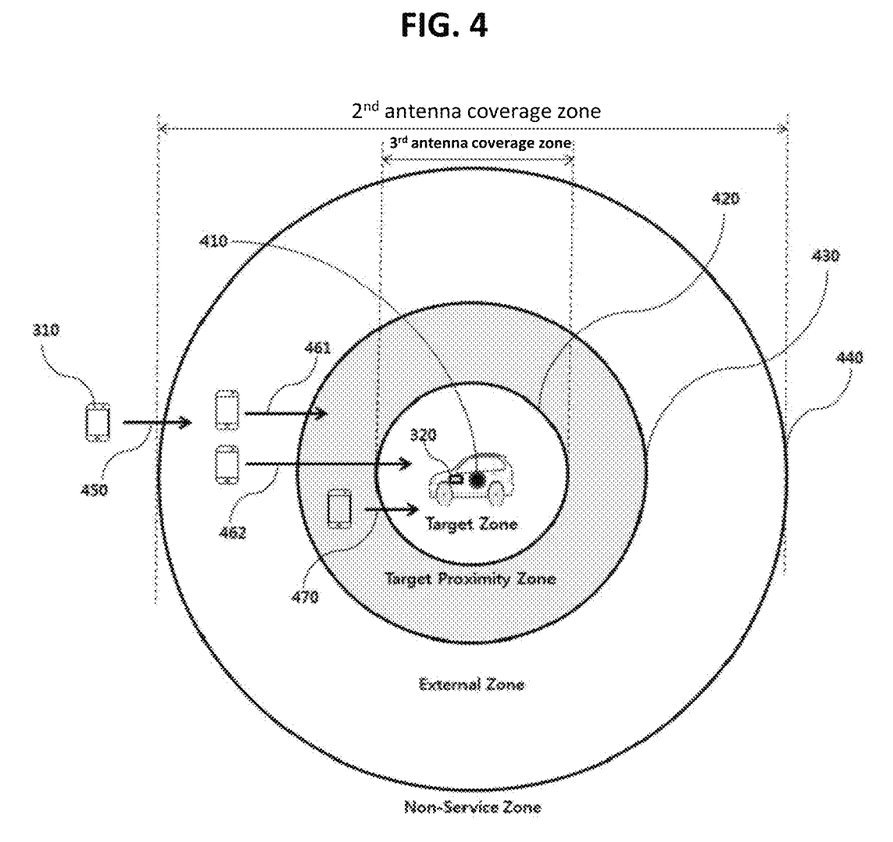
FIG. 4 is a diagram for explaining the configuration of a zone of a smart key fob system and a control operation of a vehicle smart key fob device according to an embodiment.

For example, as shown in FIG. 4 to be described later, an external zone 440 that is covered by the second antenna 324 from a vehicle center 410 may be designed to be larger than a target zone 420 that is covered by the third antenna 325. That is, the second controller 321 may perform control to transmit a stronger signal in the case in which the second antenna 324 is connected to the second nearfield communication unit 322 than the case in which the third antenna 325 is connected to the second nearfield communication unit 322.

When receiving a connection indication signal through the second nearfield communication unit 322, the second controller 321 may establish a nearfield communication connection with the smart electronic device 310 and may perform control to transmit the RSSI data transmission request signal to the smart electronic device 310 through the set communication channel.

The second controller 321 may perform a first determination procedure of comparing the RSSI value received from the smart electronic device 310 with a predefined first reference value and determining whether the smart electronic device 310 enters a target proximity zone 430 or the target zone 420 of FIG. 4.

When determining that the smart electronic device 310 enters the target proximity zone 430 or the target zone 420 in the first determination procedure, the second controller 321 may control the antenna switch 323 to connect the second nearfield communication unit 322 to the third antenna 325.

Then, the second controller 321 may perform a second determination procedure of comparing the RSSI value received from the smart electronic device 310 with a predefined second reference value and determining whether the smart electronic device 310 enters the target zone 420.

When determining that the smart electronic device 310 enters the target zone 420 in the second determination procedure, the second controller 321 may maintain an antenna connection state and the smart electronic device 310 may finally determine that the smart electronic device 310 enters the target zone 420.

When determining that the smart electronic device 310 does not enter the target zone 420 in the second determination procedure, the second controller 321 may control the antenna switch 323 to connect the second antenna 324 to the second nearfield communication unit 322.

When finally determining that the smart electronic device 310 enters the target zone 420, the second controller 321 may transmit a predetermined control signal to the vehicle electronic control device 330 through the in-vehicle communication unit 326 and may operate the vehicle.

The second controller 321 according to an embodiment may control a specific vehicle operation only after finally determining that the smart electronic device 310 enters the target zone 420.

In this case, the vehicle operation controlled by the second controller 321 may be changed based on the distance by which the smart electronic device 310 is spaced apart from the vehicle center 410 in the target zone 420.

For example, after the second controller 321 finally determines that the smart electronic device 310 enters the target zone 420, when the distance by which the smart electronic device 310 is spaced apart from the vehicle center 410, which is calculated based on the received RSSI value, is greater than a second value and is less than a first value, the second controller 321 may determine that the smart electronic device 310 enters a welcome zone. Here, the first value may be greater than the second value.

When the smart electronic device 310 enters the welcome zone, the second controller 321 may transmit a predetermined control signal to a side mirror controller 331 and/or a lighting controller 332 through an in-vehicle communication network 340, and may perform control to flash a side mirror light.

In another example, after the second controller 321 finally determines that the smart electronic device 310 enters the target zone 420, when the distance by which the smart electronic device 310 is spaced apart from the vehicle center 410, which is calculated based on the received RSSI value, is greater than a third value and is less than the second value, the second controller 321 may determine that the smart electronic device 310 enters a door-unlocking zone. Here, the second value may be greater than the third value.

When the smart electronic device 310 enters the door-unlocking zone, the second controller 321 may transmit a predetermined control signal to a door controller 333 through the in-vehicle communication network 340, and may release door lock settings. As such, the driver of the corresponding vehicle may directly open a vehicle door and may enter the vehicle without manipulation of a separate smart key and/or manipulation of the smart electronic device 310.

In another example, after the second controller 321 finally determines that the smart electronic device 310 enters the target zone 420, when the distance by which the smart electronic device 310 is spaced apart from the vehicle center 410 and which is calculated based on the received RSSI value is greater than the third value, the second controller 321 may determine that the smart electronic device 310 enters a start zone.

When the smart electronic device 310 enters a start zone, the second controller 321 may transmit a predetermined control signal to a start controller 334 through the in-vehicle communication network 340 and may release start lock settings. As such, the driver of the corresponding vehicle may turn on the vehicle through a start button for turning on the vehicle or predetermined menu selection on the smart electronic device 310.

FIG. 4 is a diagram for explaining the configuration of a zone of a smart key fob system and a control operation of a vehicle smart key fob device according to an embodiment.

Hereinafter, an operation of a vehicle smart key fob device will be described with reference to FIGS. 3 and 4 above.

As shown in reference numeral 450 of FIG. 4, when the smart electronic device 310 enters the second antenna coverage zone (the external zone 440) of the vehicle smart key fob device 320, the vehicle smart key fob device 320 may connect the smart electronic device 310 through nearfield communication.

Then, as shown in reference numerals 461 to 462, the vehicle smart key fob device 320 may perform the first determination procedure of determining whether the smart electronic device 310 enters the target proximity zone 430 or the target zone 420 based on the RSSI value received from the smart electronic device 310.

When determining that the smart electronic device 310 enters the target proximity zone 430 or the target zone 420 through the first determination procedure, the vehicle smart key fob device 320 may control the included antenna switch 323 to deactivate the second antenna 324 and to activate the third antenna 325.

The vehicle smart key fob device 320 may perform a second determination procedure of determining whether the smart electronic device 310 enters the target zone 420 based on the RSSI value received through the third antenna 325.

When determining that the smart electronic device 310 enters the target zone 420 through the second determination procedure, the vehicle smart key fob device 320 may maintain a connection state of the third antenna 325 and may start a vehicle control operation based on the received RSSI value in the target zone 420.

Figure 5:
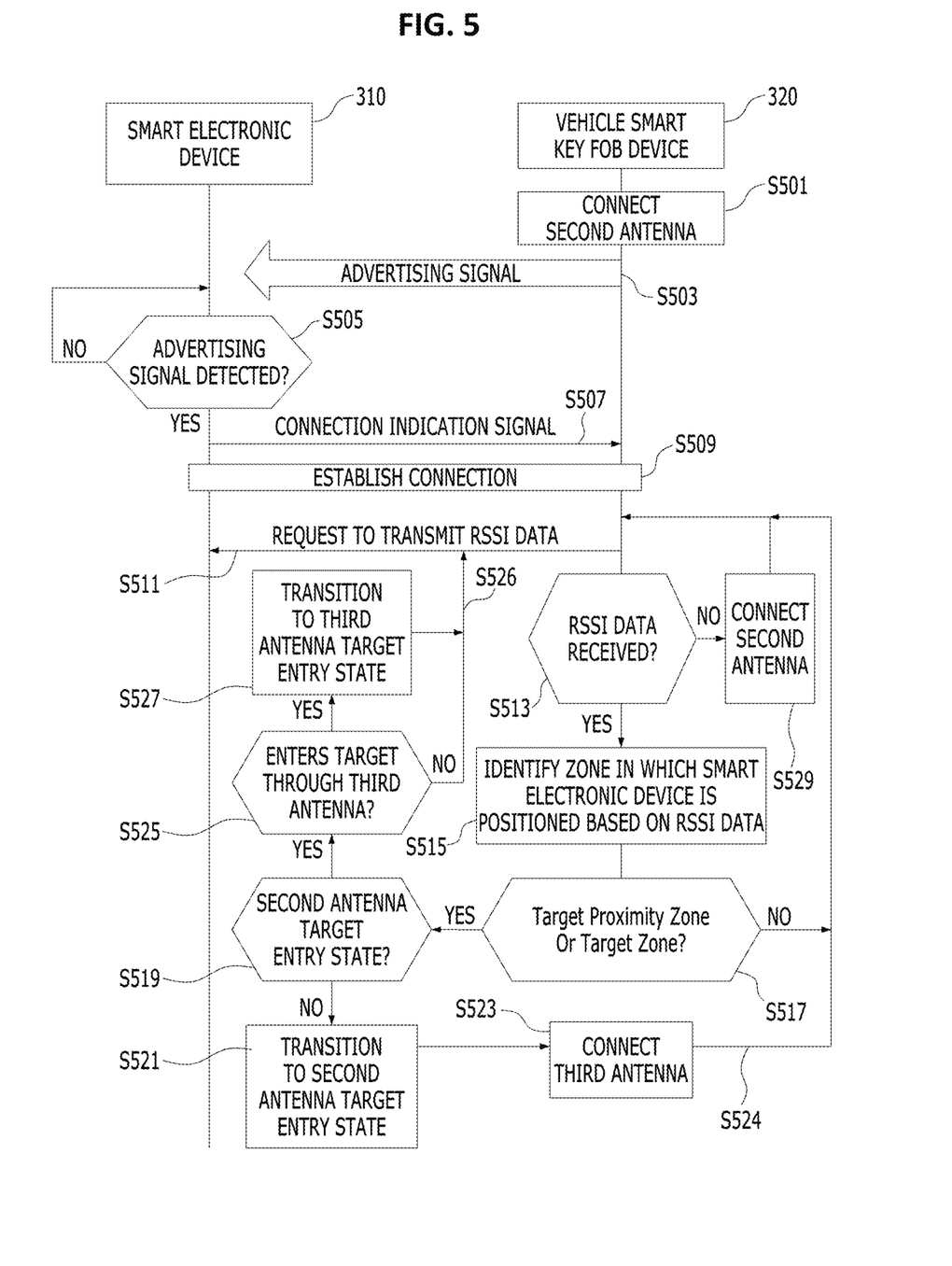
FIG. 5 is a flowchart for explaining a device location determination procedure by switching between multiple antennas in a smart key fob system according to an embodiment.

FIG. 5 is a flowchart for explaining a device location determination procedure by switching between multiple antennas in a smart key fob system according to an embodiment.

When a vehicle is turned off and a door lock is set, the vehicle smart key fob device 320 may enter a security mode.

The vehicle smart key fob device 320 may connect a second antenna and may transmit an advertising signal in the security mode (S501 to S502).

When detecting the advertising signal, the smart electronic device 310 may transmit a connection indication signal and may establish a connection via nearfield communication with the vehicle smart key fob device 320 (S505 to S509).

When a connection via nearfield communication is established, the vehicle smart key fob device 320 may request the smart electronic device 310 to transmit RSSI data (S511).

When checking whether RSSI data is received (S513) and receiving the RSSI data, the vehicle smart key fob device 320 may identify a zone in which the smart electronic device 310 is positioned, based on the received RSSI data (S515).

The vehicle smart key fob device 320 may check whether the smart electronic device 310 enters the target proximity zone 430 or the target zone 420 (S517).

As the result of checking, when the smart electronic device 310 enters the target proximity zone 430 or the target zone 420, whether the vehicle smart key fob device 320 is in a second antenna target entry state may be checked (S519). Here, the second antenna target entry state may indicate that entry of the smart electronic device 310 into the target proximity zone 430 or the target zone 420 is already verified based on the RSSI data received through the second antenna 324.

As the result of checking of operation 519, when the vehicle smart key fob device 320 is not in the second antenna target entry state, the vehicle smart key fob device 320 may transition to the second antenna target entry state (S521).

Continuously, the vehicle smart key fob device 320 may control the included antenna switch 323 so as to connect the third antenna 325 (S523). That is, the vehicle smart key fob device 320 may deactivate the second antenna 324, and may activate the third antenna 325.

The vehicle smart key fob device 320 may perform antenna switching to the third antenna 325 from the second antenna 324 and may return to operation 511 above (S524).

When the RSSI data is not received after operation 524, the vehicle smart key fob device 320 may connect the second antenna 324 through antenna switching (S529). In this case, the third antenna 325 may be deactivated.

In the state in which the third antenna 324 is connected, when receiving the RSSI data, the vehicle smart key fob device 320 may identify a zone in which the smart electronic device 310 is positioned based on the received RSSI data.

As the result of identification, when the zone in which the smart electronic device 310 is positioned is the target zone 420, the vehicle smart key fob device 320 may transition to a third antenna target entry state (S527).

In detail, when checking that the smart electronic device 310 enters the target zone 420 through the third antenna 325, which is currently activated in the second antenna target entry state, the vehicle smart key fob device 320 may transition to the third antenna target entry state from the second antenna target entry state.

When transitioning to the third antenna target entry state, the vehicle smart key fob device 320 may finally determine that the smart electronic device 310 enters the target zone 420.

Whether the vehicle smart key fob device 320 is in the third antenna target entry state may be checked, and when the vehicle smart key fob device 320 is in the third antenna target entry state, the vehicle smart key fob device 320 may request the smart electronic device 310 to transmit RSSI data and may perform the vehicle control operation based on the RSSI data (S525 and S526).

Figure 6:
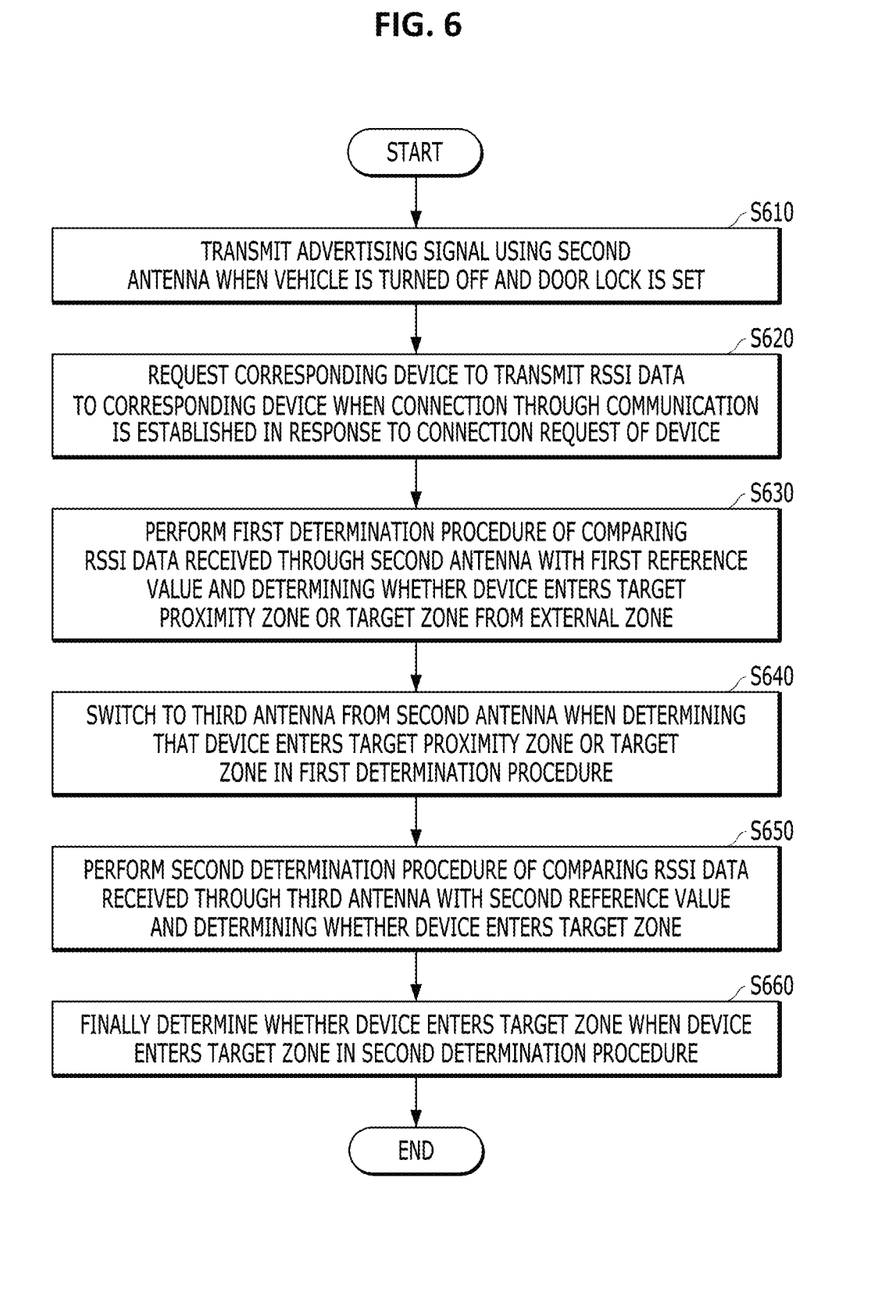
FIG. 6 is a flowchart for explaining a method of determining a location of a device by switching between multiple antennas in a vehicle smart key fob device according to an embodiment.

FIG. 6 is a flowchart for explaining a method of determining the location of a device by switching between multiple antennas in a vehicle smart key fob device according to an embodiment.

When a vehicle is turned off and a door lock is set, the vehicle smart key fob device 320 may connect the second antenna 324, and may transmit an advertising signal (S610).

When connection through communication is established in response to a connection request of a device, the vehicle smart key fob device 320 may request the corresponding device to transmit RSSI data (S620).

The vehicle smart key fob device 320 may perform a first determination procedure of comparing the RSSI data received through the second antenna with the first reference value and determining whether the device enters a target proximity zone or a target zone from the external zone (S630).

When determining that the device enters the target proximity zone or the target zone in the first determination procedure, the vehicle smart key fob device 320 may perform antenna switching to the third antenna 325 from the second antenna 324 (S640).

The vehicle smart key fob device 320 may perform a second determination procedure of comparing the RSSI data received through the third antenna with the second reference value and determining whether the device enters the target zone (S630). Here, the second reference value may be different from the first reference value, but this is merely one embodiment, and according to another embodiment, the second reference value may be the same as the first reference value (S650).

When the device enters the target zone in the second determination procedure, the vehicle smart key fob device 320 may finally determine that the device enters the target zone (S660).

Those skilled in the art will appreciate that the embodiments of the disclosure may be carried out in specific ways other than those set forth herein without departing from the spirit and essential characteristics of the embodiments.

The above embodiments are therefore to be construed in all aspects as illustrative and not restrictive. The scope of the embodiments should be determined by the appended claims and their legal equivalents, not by the above description, and all changes coming within the meaning and equivalency range of the appended claims are intended to be embraced therein.

INDUSTRIAL APPLICABILITY

The embodiments may be applied to a vehicle smart key fob system including a multiple antenna.

The invention claimed is:

1. A method of determining a location of a device by switching between multiple antennas, the method comprising:
in response to a vehicle entering a security mode, connecting a second antenna having a first coverage zone and transmitting an advertising signal;
in response to detecting the device, establishing a connection between the second antenna and a first antenna of the device and requesting the device to transmit received signal strength indicator (RSSI) data;
performing a first determination operation of determining whether the device enters a target proximity zone or a target zone based on the RSSI data received through the second antenna;
in response to determining that the device enters the target proximity zone or the target zone in the first determination operation, connecting a third antenna having a narrower range than the first coverage zone, and disconnecting the second antenna;
performing a second determination operation of determining whether the device enters the target zone based on the RSSI data received through the third antenna; and
in response to determining that the device enters the target zone in the second determination operation, finally determining that the device enters the target zone.

2. The method of claim 1, wherein the RSSI data is received through Bluetooth Low Energy (BLE) communication.

3. The method of claim 1, wherein:
the first determination operation includes comparing the RSSI data received through the second antenna with a first reference value; and
in response to the RSSI data received through the second antenna being greater than the first reference value, determining the device enters the target proximity zone or the target zone.

4. The method of claim 3, wherein:
the second determination operation includes comparing the RSSI data received through the third antenna with a second reference value; and
in response to the RSSI data received through the third antenna being greater than the second reference value, finally determining the device enters the target zone.

5. The method of claim 4, wherein, in response to the RSSI data received through the third antenna not being greater than the second reference value, reconnecting the second antenna.

6. The method of claim 4, wherein the first reference value and the second reference value are different from each other.

7. The method of claim 1, wherein the security mode is executed in response to the vehicle being turned off and a door lock being set.

8. The method of claim 1, further comprising:
in response to finally determining that the device enters the target zone, performing a vehicle control operation based on the RSSI data received through the third antenna.

9. The method of claim 8, further comprising:
calculating a distance by which the device is spaced apart from a center of the vehicle and performing the vehicle control operation depending on the calculated distance.

10. The method of claim 9, wherein the vehicle control operation includes at least one of a welcome operation, a door-unlocking operation, or a start control operation.

11. A vehicle smart key fob device comprising:
a second antenna having a first coverage zone and a third antenna having a second coverage zone narrower than the first coverage zone;
a nearfield communication unit configured to transmit and receive a signal through the second antenna or the third antenna;
an antenna switch configured to connect any one of the second antenna and the third antenna to the nearfield communication unit; and
a controller configured to:
connect the second antenna and transmit an advertising signal in response to a vehicle entering a security mode, establish a connection with a first antenna of the device and request the device to transmit received signal strength indicator (RSSI) data in response to detecting the device, perform a first determination operation of determining whether the device enters a target proximity zone or a target zone based on the RSSI data received through the second antenna, control the antenna switch to connect the third antenna and to disconnect the second antenna, in response to determining that the device enters the target proximity zone or the target zone through the first determination operation, perform a second determination operation of determining whether the device enters the target zone based on the RSSI data received through the third antenna, and finally determine that the device enters the target zone in response to determining that the device enters the target zone through the second determination operation.

12. The vehicle smart key fob device of claim 11, wherein the nearfield communication unit receives the RSSI data through Bluetooth Low Energy (BLE) communication.

13. The vehicle smart key fob device of claim 11, wherein the controller compares the RSSI data received through the second antenna with a first reference value, and
when the RSSI data received through the second antenna is greater than the first reference value, the controller determines that the device enters the target proximity zone or the target zone.

14. The vehicle smart key fob device of claim 13, wherein the controller compares the RSSI data received through the third antenna with a second reference value, and
when the RSSI data received through the third antenna is greater than the second reference value, the controller finally determines that the device enters the target zone.

15. The vehicle smart key fob device of claim 14, wherein, when the RSSI data received through the third antenna is not greater than the second reference value, the controller drives the antenna switch to connect the second antenna.

16. The vehicle smart key fob device of claim 14, wherein the first reference value and the second reference value are different from each other.

17. The vehicle smart key fob device of claim 11, wherein the vehicle enters the security mode when the vehicle is turned off and a door lock is set.

18. The vehicle smart key fob device of claim 11, wherein, in response to finally determining that the device enters the target zone, the controller performs a vehicle control operation based on the RSSI data received through the third antenna.

19. The vehicle smart key fob device of claim 18, wherein the controller calculates a distance by which the device is spaced apart from a center of the vehicle and performs the vehicle control operation depending on the calculated distance.

20. The vehicle smart key fob device of claim 19, wherein the vehicle control operation includes at least one of a welcome operation, a door-unlocking operation, or a start control operation.

* * * * *